United States Patent
He et al.

(10) Patent No.: US 11,259,329 B2
(45) Date of Patent: Feb. 22, 2022

(54) PRIORITIZED RANDOM ACCESS PROCEDURE

(71) Applicant: QUALCOMM Incorporated, San Diego, CA (US)

(72) Inventors: Linhai He, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/105,750

(22) Filed: Aug. 20, 2018

(65) Prior Publication Data

US 2019/0059113 A1    Feb. 21, 2019

Related U.S. Application Data

(60) Provisional application No. 62/548,291, filed on Aug. 21, 2017.

(51) Int. Cl.
*H04W 74/08*    (2009.01)
*H04W 74/00*    (2009.01)

(52) U.S. Cl.
CPC ... *H04W 74/0833* (2013.01); *H04W 74/0875* (2013.01); *H04W 74/006* (2013.01)

(58) Field of Classification Search
CPC ......... H04W 74/0833; H04W 74/0875; H04W 74/006
See application file for complete search history.

(56) References Cited

U.S. PATENT DOCUMENTS

2006/0268768 A1* 11/2006 Harris .................. H04W 48/12
                                                  370/328
2009/0257421 A1* 10/2009 Nakashima ....... H04W 74/0833
                                                  370/345

(Continued)

FOREIGN PATENT DOCUMENTS

CN        102014516 A     4/2011
CN        102291822 A    12/2011

(Continued)

OTHER PUBLICATIONS

Asustek et al., "Discussion on RA Backoff in NR", 3GPP Draft, R2-1707010 Discussion on RA Backoff in NR, 3RD Generation Partnership Project (3GPP), Mobile Competence Centre, 650, Route Des Lucioles, F-06921 Sophia-Antipolis Cedex, France, vol. RAN WG2, No. Qingdao, China, Jun. 27, 2017-Jun. 29, 2017, Jun. 16, 2017 (Jun. 16, 2017), XP051306695, 4 Pages, Retrieved from the Internet: URL:http://www.3gpp.org/ftp/tsg_ran/WG2_RL_2/TSGR2_AHs/2017_06_NR/Docs/ [retrieved on Jun. 16, 2017].

(Continued)

*Primary Examiner* — Jael M Ulysse
(74) *Attorney, Agent, or Firm* — Patterson & Sheridan, L.L.P.

(57) ABSTRACT

Aspects of the present disclosure relate to prioritized random access procedures in wireless systems. An exemplary method generally includes receiving, from a user equipment, a random access request including information identifying a type of a random access event being invoked, identifying one or more parameters associated with a backoff interval to be observed at the user equipment based, at least in part, on a priority associated with the type of the random access event, and transmitting, to the user equipment, a random access response including the identified one or more parameters.

30 Claims, 12 Drawing Sheets

(56) References Cited

U.S. PATENT DOCUMENTS

| | | | | |
|---|---|---|---|---|
| 2012/0051297 A1* | 3/2012 | Lee | ...................... | H04W 80/02 370/329 |
| 2012/0275305 A1* | 11/2012 | Lin | .................. | H04W 74/0841 370/235 |
| 2012/0275378 A1* | 11/2012 | Lee | .................... | H04L 27/2607 370/328 |
| 2013/0034059 A1* | 2/2013 | Lee | .................... | H04W 74/006 370/328 |
| 2013/0040597 A1* | 2/2013 | Jang | ................. | H04W 74/0833 455/404.1 |
| 2013/0301541 A1* | 11/2013 | Mukherjee | ........ | H04W 74/0833 370/329 |
| 2014/0010180 A1* | 1/2014 | Lee | ...................... | H04W 72/04 370/329 |
| 2015/0282214 A1* | 10/2015 | Lee | .................... | H04W 74/085 370/329 |
| 2015/0312798 A1* | 10/2015 | Rune | .................... | H04L 1/0072 370/236 |
| 2016/0150566 A1* | 5/2016 | Lee | .................... | H04W 74/008 370/329 |
| 2016/0165378 A1* | 6/2016 | Harsha | .................... | H04W 4/70 370/329 |
| 2017/0367120 A1* | 12/2017 | Murray | ................ | H04B 7/0695 |
| 2018/0317264 A1* | 11/2018 | Agiwal | ................ | H04W 52/50 |

FOREIGN PATENT DOCUMENTS

| | | |
|---|---|---|
| KR | 20130029066 A | 3/2013 |
| RU | 2469512 C2 | 12/2012 |

OTHER PUBLICATIONS

China Mobile et al., "Backoff for UEs of Different Priorities", 3GPP Draft, R2-080750, 3rd Generation Partnership Project (3GPP), Mobile Competence Centre, 650, Route Des Lucioles, F-06921 Sophia-Antipolis Cedex France, vol. RAN WG2, No. Sorrento, Italy, Feb. 5, 2008, Feb. 5, 2008 (Feb. 5, 2008), XP050138577, 4 Pages.

CMCC et al., "Differentiate Access Causes in RACH Backoff", 3GPP Draft, R2-082547 Differentiate Access Causes in RACH Backoff, 3RD Generation Partnership Project (3GPP), Mobile Competence Centre, 650, Route Des Lucioles, F-06921 Sophia-Antipolis Cedex, France, vol. RAN WG2, No. Kansas City, USA, Apr. 29, 2008, Apr. 29, 2008 (Apr. 29, 2008), XP050140219, 4 Pages.

International Search Report and Written Opinion—PCT/US2018/047198—ISA/EPO—dated Nov. 15, 2018.

Qualcomm Incorporated: "Differentiated Random Access in NR", 3GPP Draft, R2-1706518 Differentiated Random Access in NR, 3Rd Generation Partnership Project (3GPP), Mobile Competence Centre, 650, Route Des Lucioles, F-06921 Sophia-Antipolis Cedex, France, vol. RAN, WG2, No. Qingdao, China, Jun. 27, 2017-Jun. 29, 2017, Jun. 17, 2017 (Jun. 17, 2017), XP051307037, 4 Pages, Retrieved from the Internet: URL:http://www.3gpp.org/ftp/tsg_ran/WG2 RL2/TSGR2 AHs/2017 06 NR/Docs/ [retrieved on Jun. 17, 2017].

Taiwan Search Report—TW107129099—TIPO—dated Aug. 20, 2021.

* cited by examiner

PRIORITIZED RANDOM ACCESS PROCEDURE

CROSS-REFERENCE TO RELATED APPLICATIONS

This application claims benefit of U.S. Provisional Patent Application Ser. No. 62/548,291, filed Aug. 21, 2017, entitled "Prioritized Random Access Procedure," and assigned to the assignee hereof, the contents of which are hereby incorporated by reference in its entirety.

BACKGROUND

Field of the Disclosure

Aspects of the present disclosure relate to wireless communications, and more particularly, prioritized random access in wireless communications systems.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

As described herein, certain wireless systems may employ directional beams for transmission and reception.

Certain aspects of the present disclosure provide a method for wireless communication that may be performed, for example, by a base station (BS). The method generally includes receiving, from a user equipment (UE), a random access request including information identifying a type of a random access event being invoked, identifying one or more backoff adjustment parameters associated with a backoff interval to be observed at the user equipment based, at least in part, on a priority associated with the type of the random access event, and transmitting, to the user equipment, a random access response including the identified one or more backoff adjustment parameters.

Certain aspects of the present disclosure provide a method for wireless communication that may be performed, for example, by a UE. The method generally includes transmitting, to a base station, a random access request, receiving, from the base station, a random access response including one or more backoff adjustment parameters, and based on the one or more backoff adjustment parameters and a priority associated with a type of the random access request, determining a backoff interval defining an amount of time to wait until retransmitting the random access request.

Certain aspects of the present disclosure provide a method for wireless communication that may be performed, for example, by a base station (BS). The method generally includes transmitting, to a user equipment (UE), configuration information comprising one or more backoff adjustment scaling factors, each backoff adjustment scaling factor being associated with a different random access priority level, receiving, from the UE, a random access request including information identifying a type of random access event being invoked, and transmitting, to the UE, a random access response including a backoff parameter used in conjunction with the one or more backoff adjustment scaling factors to calculate a backoff period.

Certain aspects of the present disclosure provide a method for wireless communication that may be performed, for example, by a user equipment (UE). The method generally includes receiving, from a base station (BS), configuration information comprising one or more backoff adjustment scaling factors, each backoff adjustment scaling factor being associated with a different random access priority level, transmitting, to the BS, a random access request, receiving, from the BS, a random access response including a backoff parameter, calculating a backoff period based on the backoff parameter and the one or more backoff adjustment scaling factors, and retransmitting the random access request after the calculated backoff period has elapsed.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
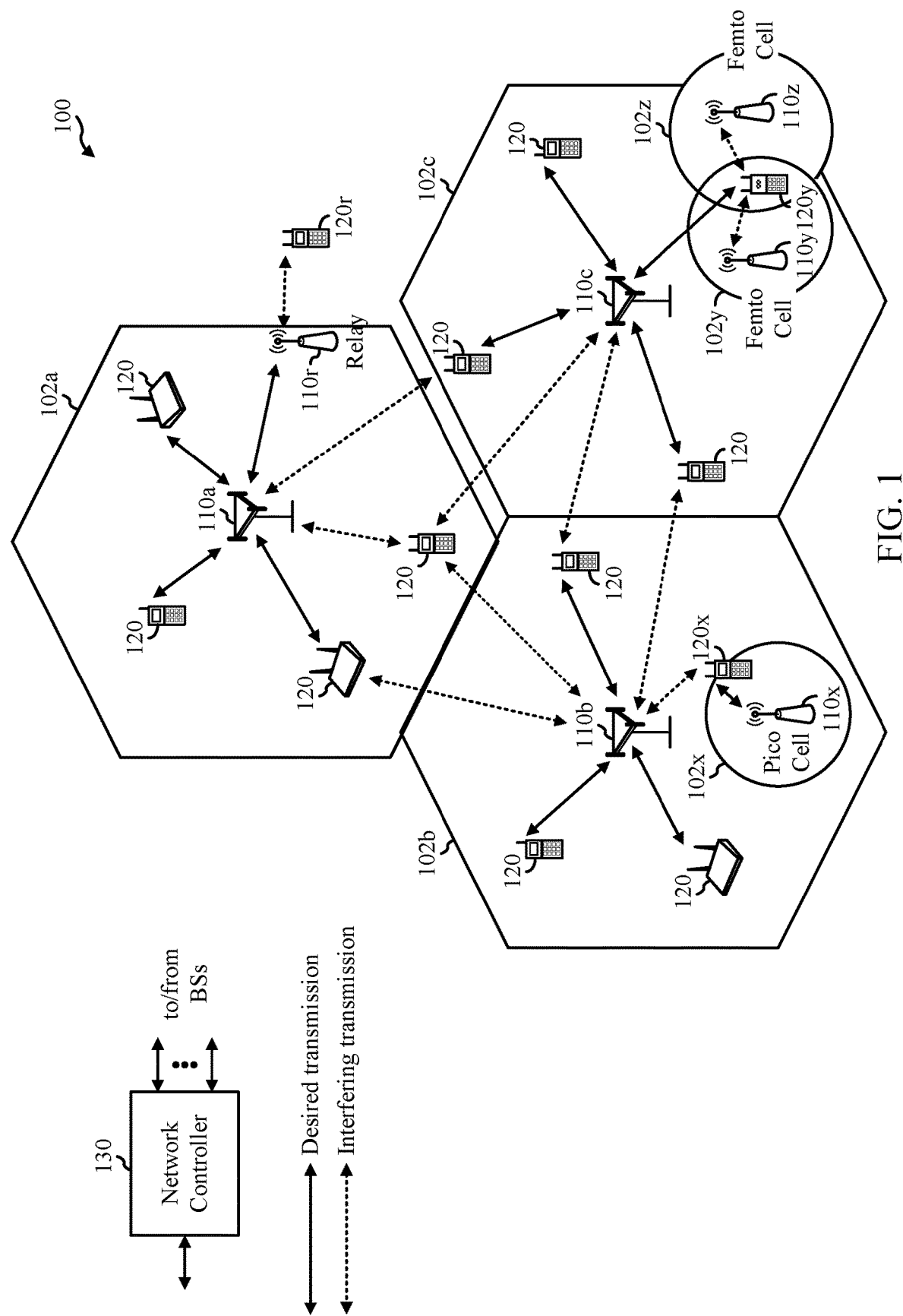
FIG. 1 is a block diagram conceptually illustrating an example telecommunications system, in accordance with certain aspects of the present disclosure.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate over active beam-formed transmission beams. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

Example Wireless Communications System

Figure 8:
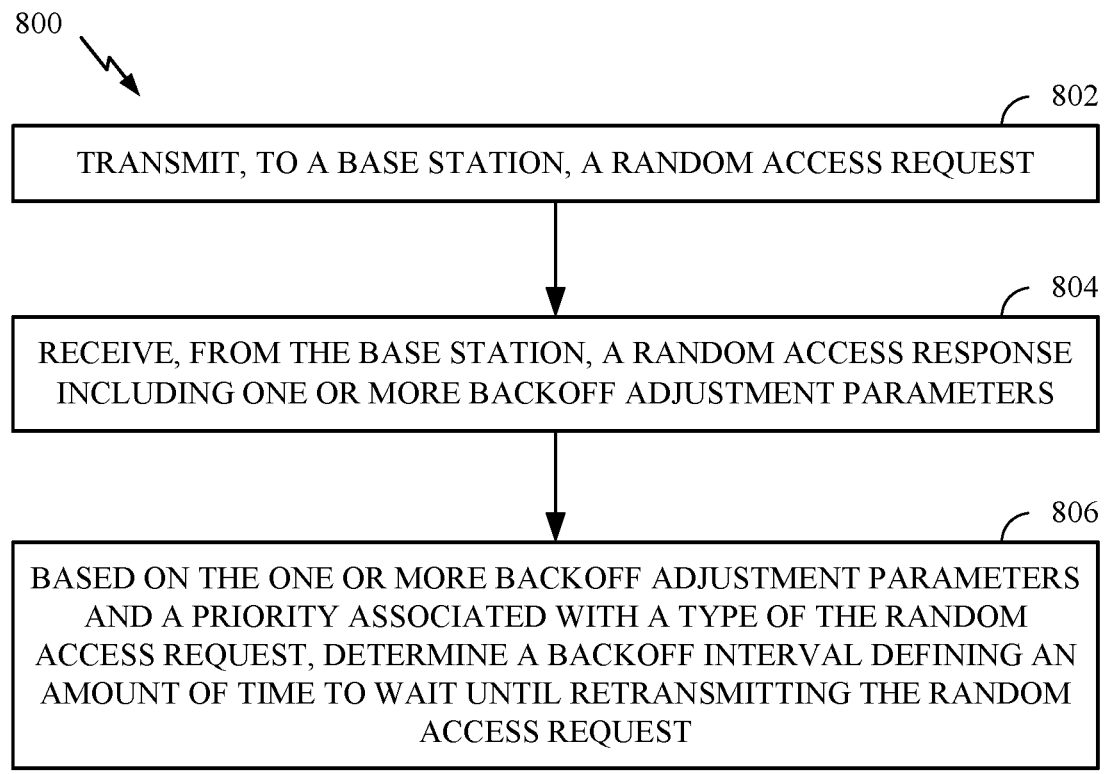
FIG. 8 illustrates an example operation performed by a user equipment (UE) for performing prioritized random access, in accordance with certain aspects of the present disclosure.

FIG. 1 illustrates an example wireless network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

In order to more efficiently use resources and conserve power when communicating using beamforming, the UEs 120 may be configured to perform the operations 900 and methods described herein for UE receiver beamforming. BS 110 may comprise a transmission reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
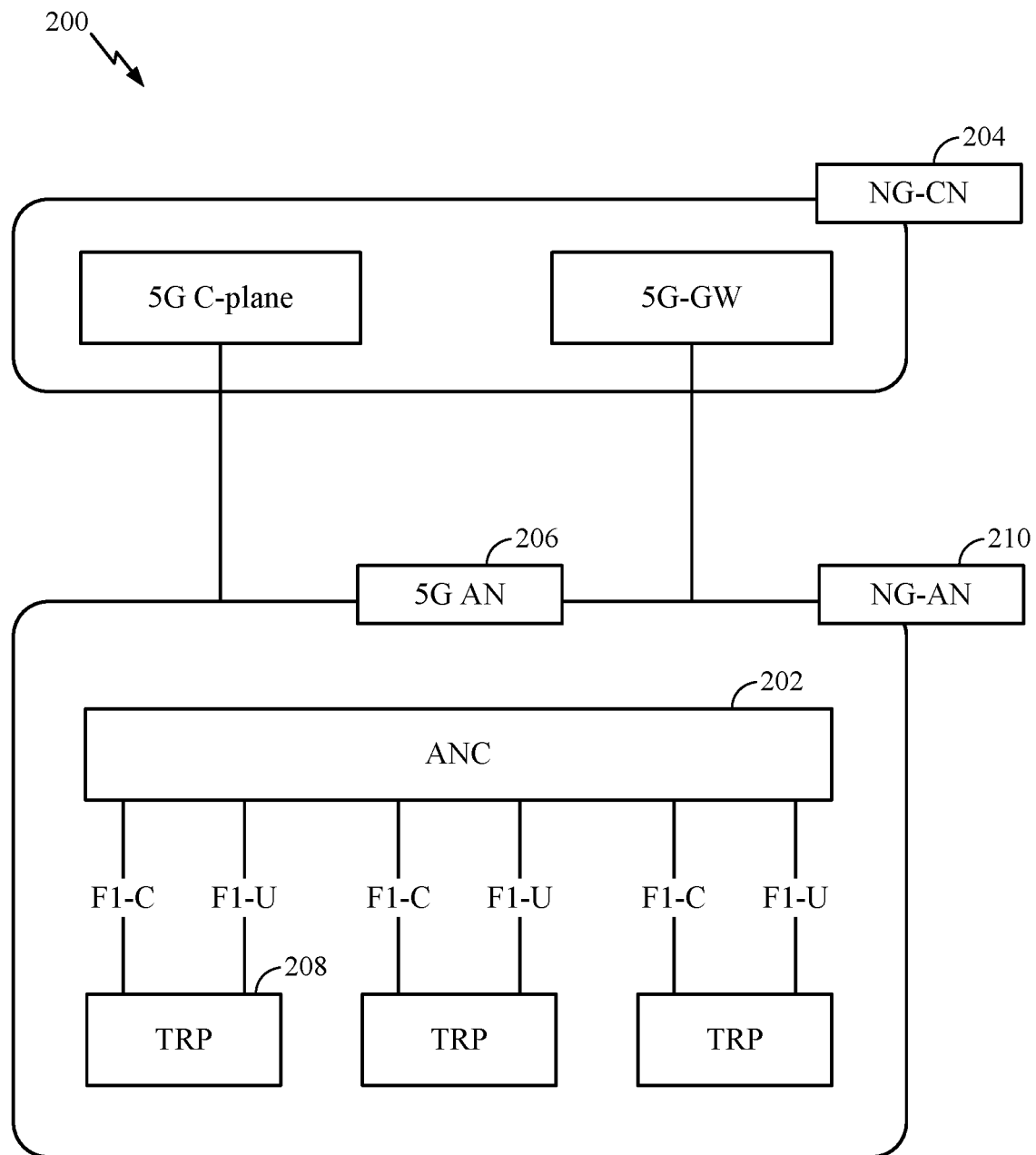
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
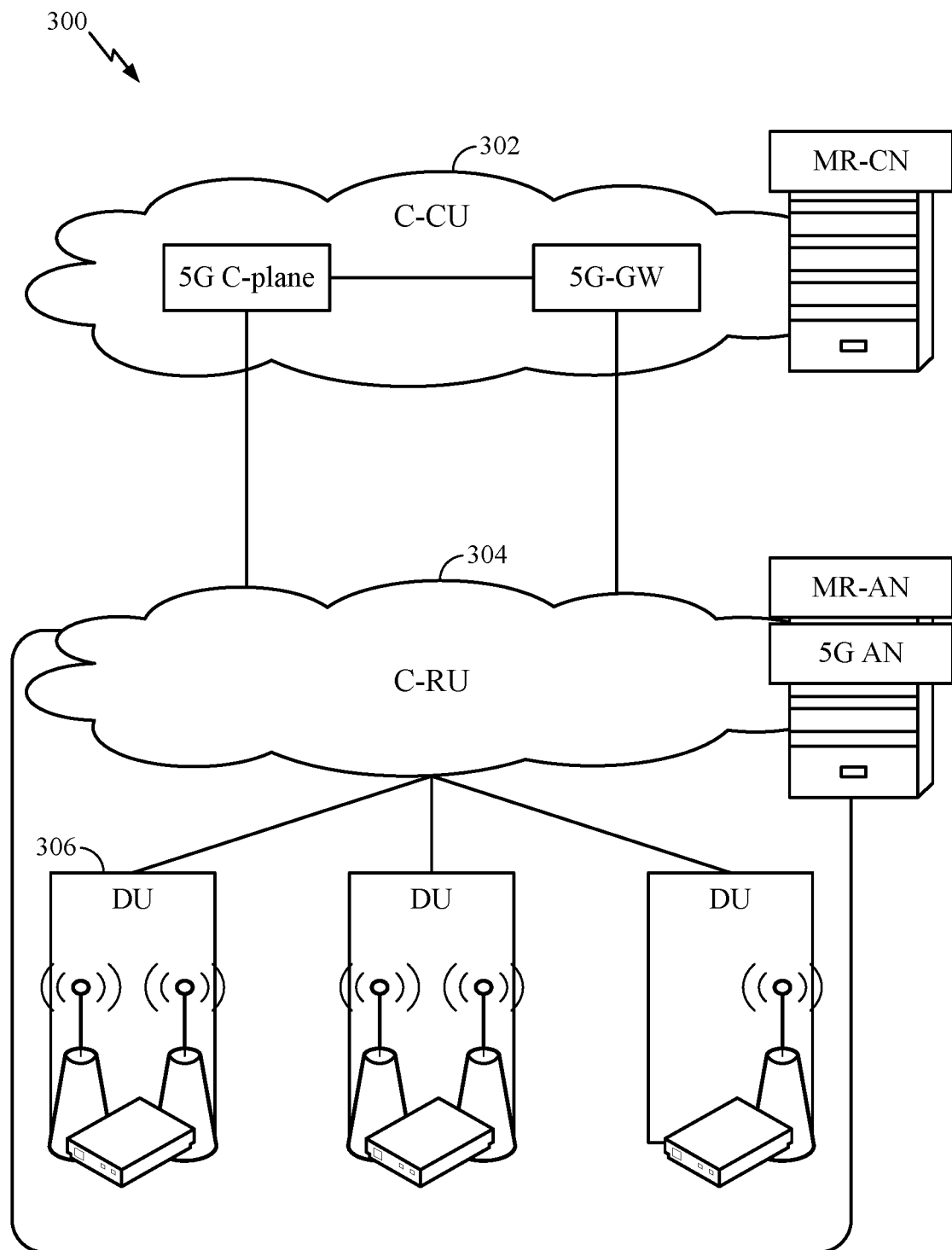
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
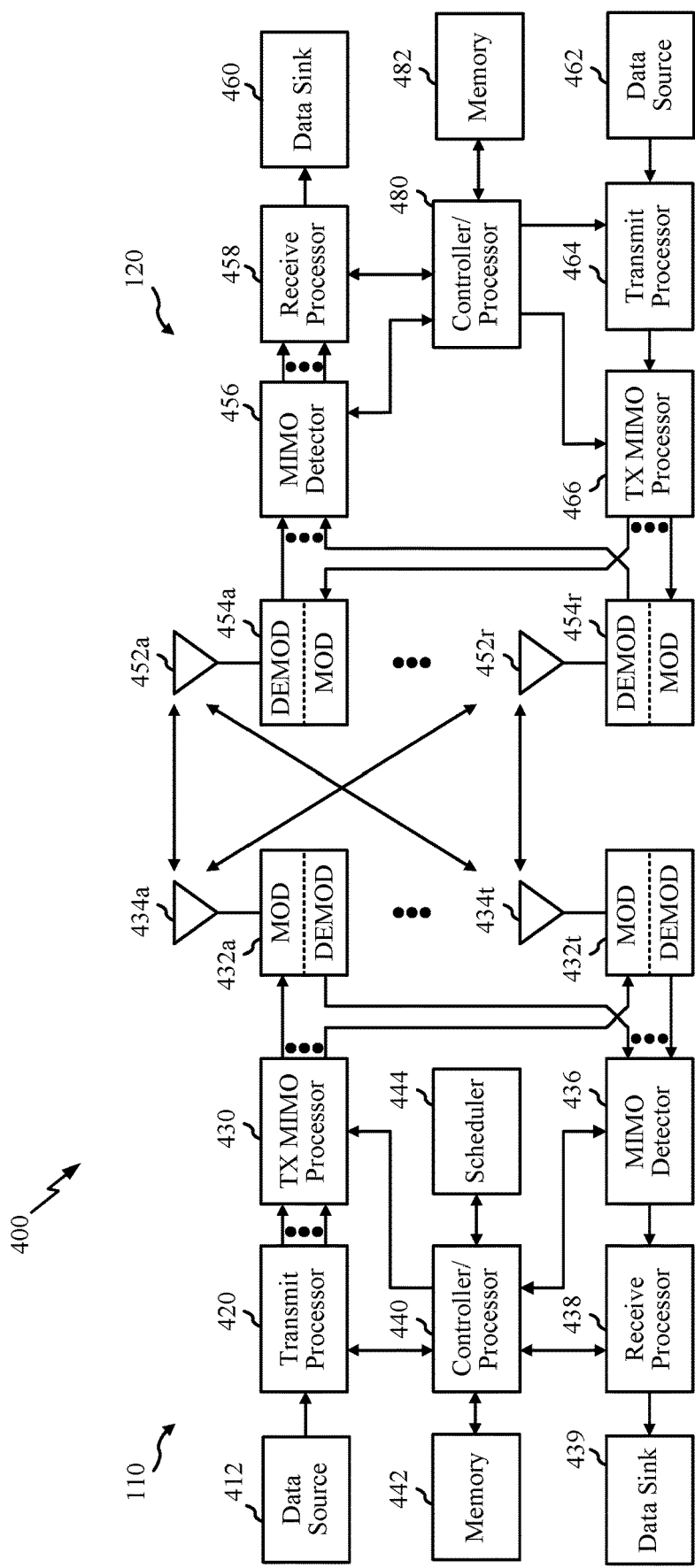
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform the operations described herein and illustrated with reference to FIGS. 9 and 11-12. According to an example, antennas 434, DEMOD/MOD 432, processors 430, 420, 438 and/or controller/processor 440 of the BS 110 may be used to perform the operations described herein and illustrated with reference to FIGS. 10-12.

As an example, one or more of the antennas 452, DEMOD/MOD 454, processors 466, 458, 464, and/or controller/processor 480 of the UE 120 may be configured to perform the operations described herein for UE beam-based tagging. Similarly, one or more of the 434, DEMOD/MOD 432, processors 430, 420, 438 and/or controller/processor 440 of the BS 110 may be configured to perform the operations described herein.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 9, and/or other processes for the techniques described herein and those illustrated in the appended drawings. The processor 440 and/or other processors and modules at the BS 110 may perform or direct processes for the techniques described herein and those illustrated in the appended drawings. The memories 442 and 482 may store data and program codes for the BS 110 and the UE 120, respectively.

Figure 5:
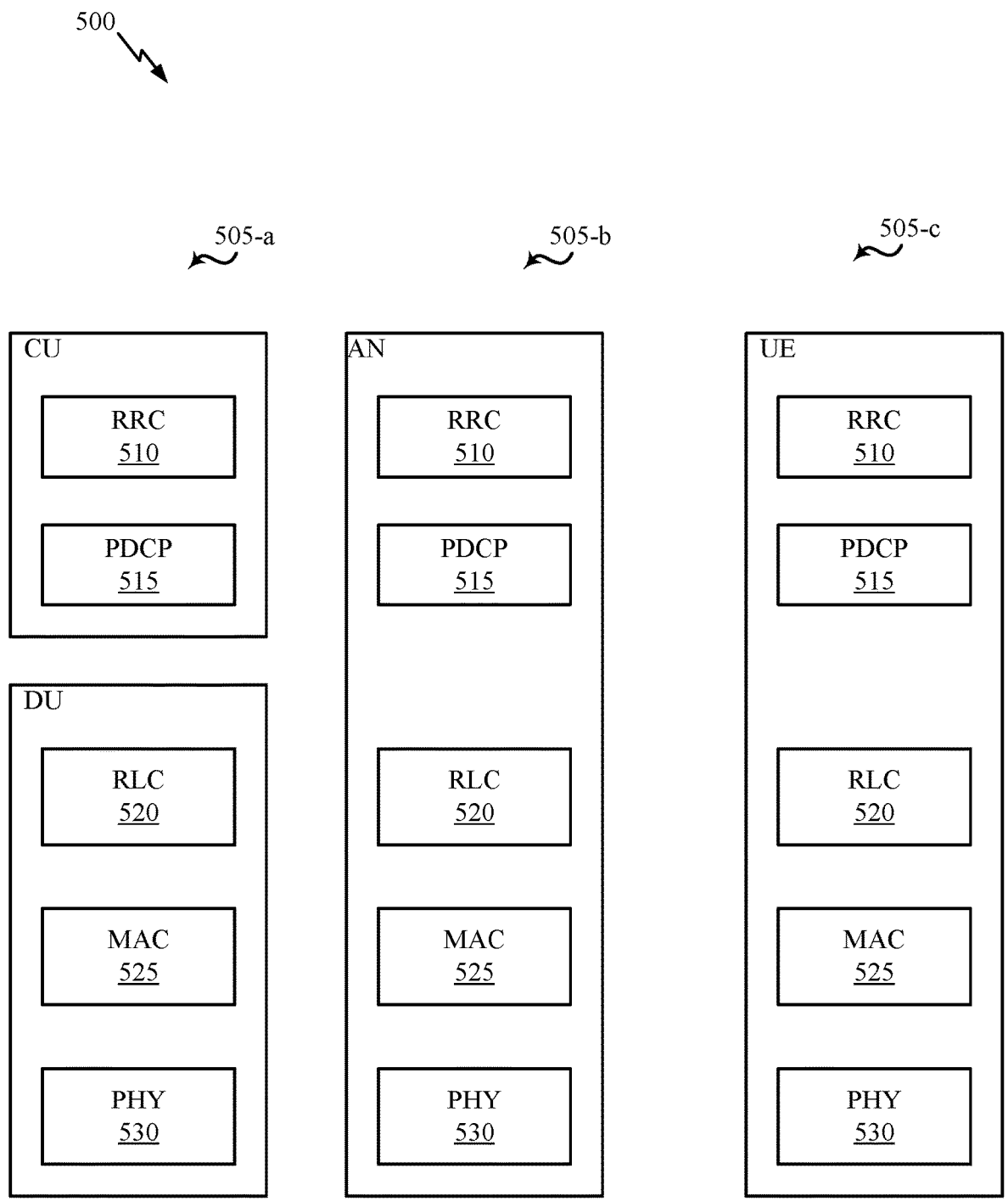
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
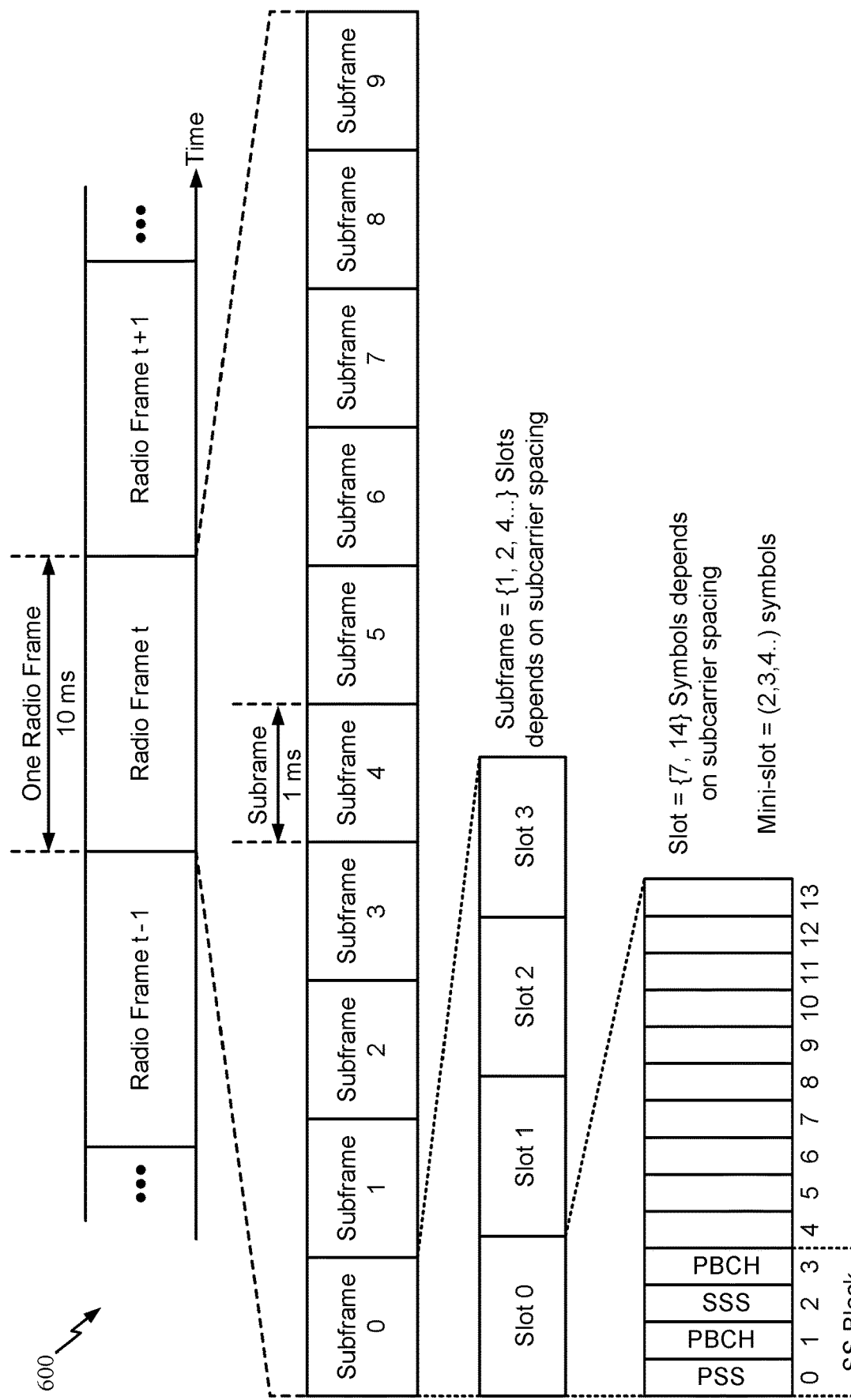
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Prioritized Random Access Procedure

In some wireless communications systems, UEs may perform the same random access procedure with the same set of configured parameters. In these systems, no differentiation or prioritization may be available to distinguish certain types of events from other types of events. However, prioritization of events may be useful in various scenarios. For example, in cases where a network supports different types of services with different objectives for network access, some services may prioritize speed (e.g., Ultra-Reliable Low Latency Communication, or ULRRC, services), while other services may not be latency-sensitive and may prioritize power usage over speed of access (e.g., enhanced Machine-Type Communications, or eMTC, systems). In another example, where network slicing allows for the differentiation of transport services over the same physical network, some of the differentiated services may require faster access to the network than other services. Additionally, different types of random access events may be processed using different access delays. For example, a UE in RRC Connected mode that is using a random access procedure for resynchronization may be prioritized over a UE in RRC Idle mode that is attempting to initially access a network.

Aspects of the present disclosure provide for prioritizing random access procedures by adjusting backoff intervals and communicating adjustments to backoff intervals based on a priority of a random access event. By modifying backoff adjustment parameters based on a priority associated with a random access event, a system can prioritize higher-priority random access events (e.g., by instructing a user equipment to retransmit immediately or with a short backoff interval) over lower-priority random access events, which may be associated with longer backoff intervals.

To achieve prioritization among different types of UEs and different types of random access events, the backoff adjustment parameter value used in a backoff mechanism may be configured to assign different priorities, and thus, different backoff periods, to different types of random access events. Each priority j may be configured with a backoff parameter. In some embodiments, the backoff parameter may be defined as an interval between a lower bound $T1j$ and an upper bound $T2j$ for a given priority level j. The lower bound $T1j$ and upper bound $T2j$ may be transmitted from a base station to a UE, for example, in dedicated signaling or one or more system information blocks (SIBs). When a UE prepares to invoke a random access procedure to request access, the UE delays transmitting the request to the base station by a random amount of time between $T1j$ and $T2j$. In some cases, one or more of $T1j$ and $T2j$ may be set to the value of 0 by the network to allow for fast initial access.

In some embodiments, a UE may be configured with a backoff scaling factor associated with each priority j, as discussed in further detail below. The backoff scaling factor may be used, in conjunction with a backoff interval signaled by a base station, to determine a backoff period for a particular random access event. For example, the backoff scaling factor may indicate a percentage or fraction of the signaled backoff interval for the UE to use in delaying the transmission of a random access event. When a UE prepares to invoke a random access procedure to request access, the UE delays transmitting the request to the base station by an amount of time equal to the product of the backoff scaling factor and the signaled backoff interval. In some cases, high priority random access events may be associated with a backoff scaling factor of 0 to allow for fast network access.

In some cases, a network may experience high access loads. To accommodate high access loading, the network may use the backoff indicator field to instruct UEs performing a random access procedure to gain access to the network to delay transmission and retransmission of certain random access requests. As discussed herein, the network may prioritize some random access events by initializing the lower bound $T1j$ and upper bound $T2j$ or backoff scaling factor to 0 and not adjusting the backoff intervals for these random access events or making a small adjustment to the backoff intervals for these random access events (e.g., by applying a small or zero backoff scaling factor to a signaled backoff interval). For lower-priority random access events, the network may make larger adjustments to the backoff intervals, such as applying a large backoff scaling factor (e.g., a backoff scaling factor approaching 1, indicating the use of most of all of a signaled backoff interval) to a signaled backoff interval, which may result in UEs invoking lower-priority random access events waiting for a longer period of time before transmitting or retransmitting a random access request.

Figure 7:
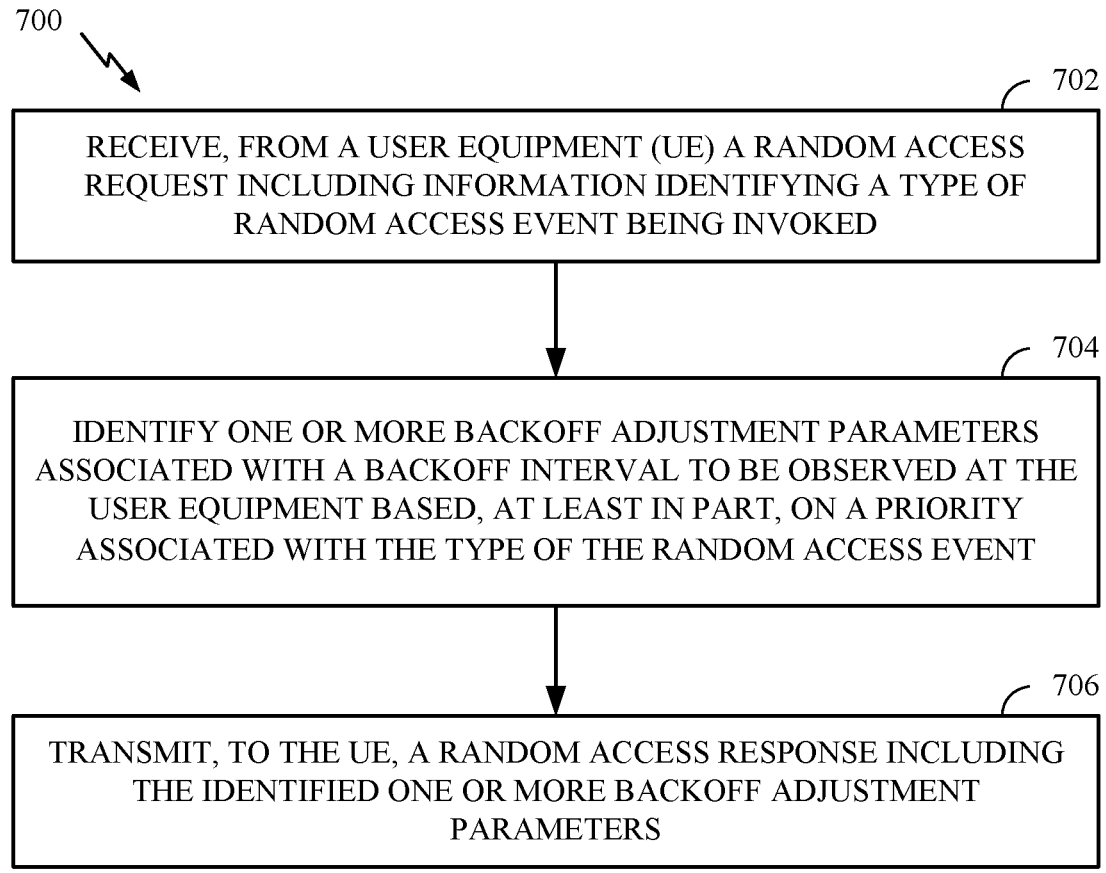
FIG. 7 illustrates an example operation performed by a base station (BS) for performing prioritized random access, in accordance with certain aspects of the present disclosure.

FIG. 7 illustrates example operations that may be performed by a base station for prioritized random access, according to an embodiment. As illustrated, operations 700 begin at 702, where the base station receives, from a user equipment a random access request including information identifying a type of random access event being invoked. At 704, the base station identifies one or more backoff adjustment parameters associated with a backoff interval to be observed at the user equipment. The one or more backoff adjustment parameters may be identified based, at least in part, on a priority associated with a type of the random access event. At 706, the base station transmits, to the user equipment, a random access response including the identified one or more backoff adjustment parameters.

FIG. 8 illustrates example operations that may be performed by a user equipment for prioritized random access, according to an embodiment. As illustrated, operations 800 begin at 802, where the user equipment transmits, to a base station, a random access request. At 804, the user equipment receives, from the base station, a random access response. The random access response generally includes one or more backoff adjustment parameters. At 806, the user equipment determines a backoff interval defining an amount of time to wait until retransmitting the random access request. The backoff interval may be determined based on the one or more backoff adjustment parameters and a priority associated with a type of the random access request.

Figure 9:
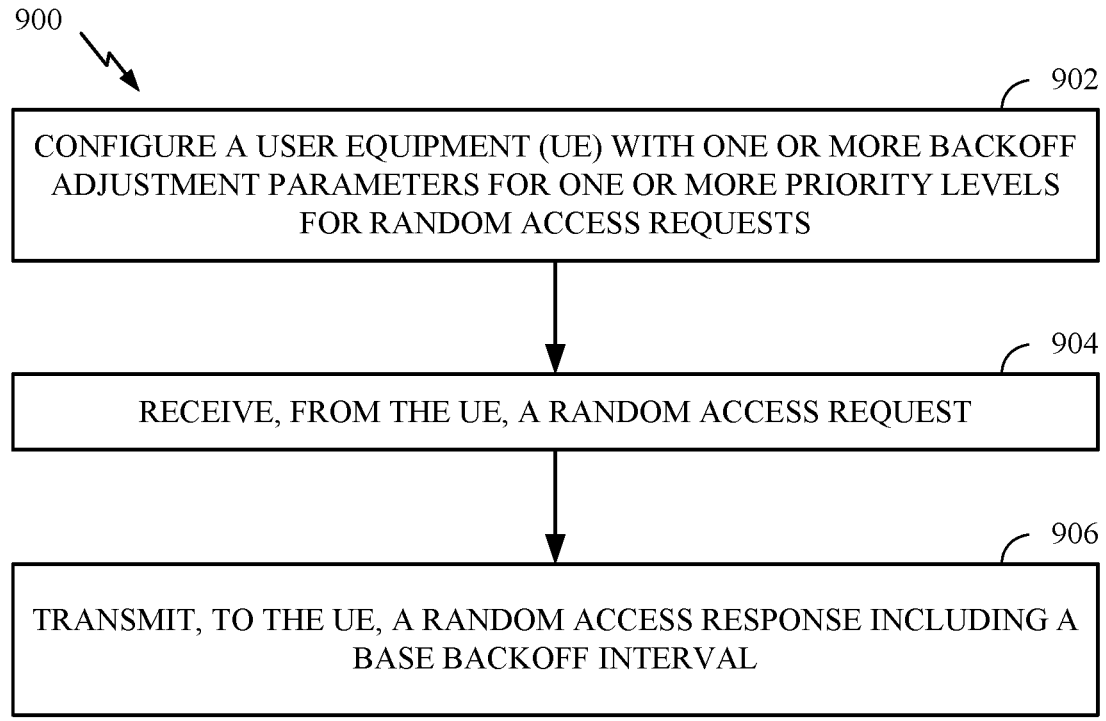
FIG. 9 illustrates an example operation performed by a base station (BS) for configuring a user equipment (UE) for prioritized random access, in accordance with certain aspects of the present disclosure.

FIG. 9 illustrates example operations that may be performed by a base station for prioritized random access, according to an embodiment. As illustrated, operations 900 begin at 902, where a base station configures a user equipment with one or more backoff adjustment parameters for one or more priority levels for random access requests. In some embodiments, as discussed herein, the one or more backoff adjustment parameters may include backoff scaling factors associated with different random access priority levels which the UE may use to modify a base backoff interval. At 904, the base station receives, from a user equipment, a random access request. The random access request may include information identifying a type of random access event being invoked. At 906, the base station transmits, to the user equipment, a random access response including a base backoff interval.

Figure 10:
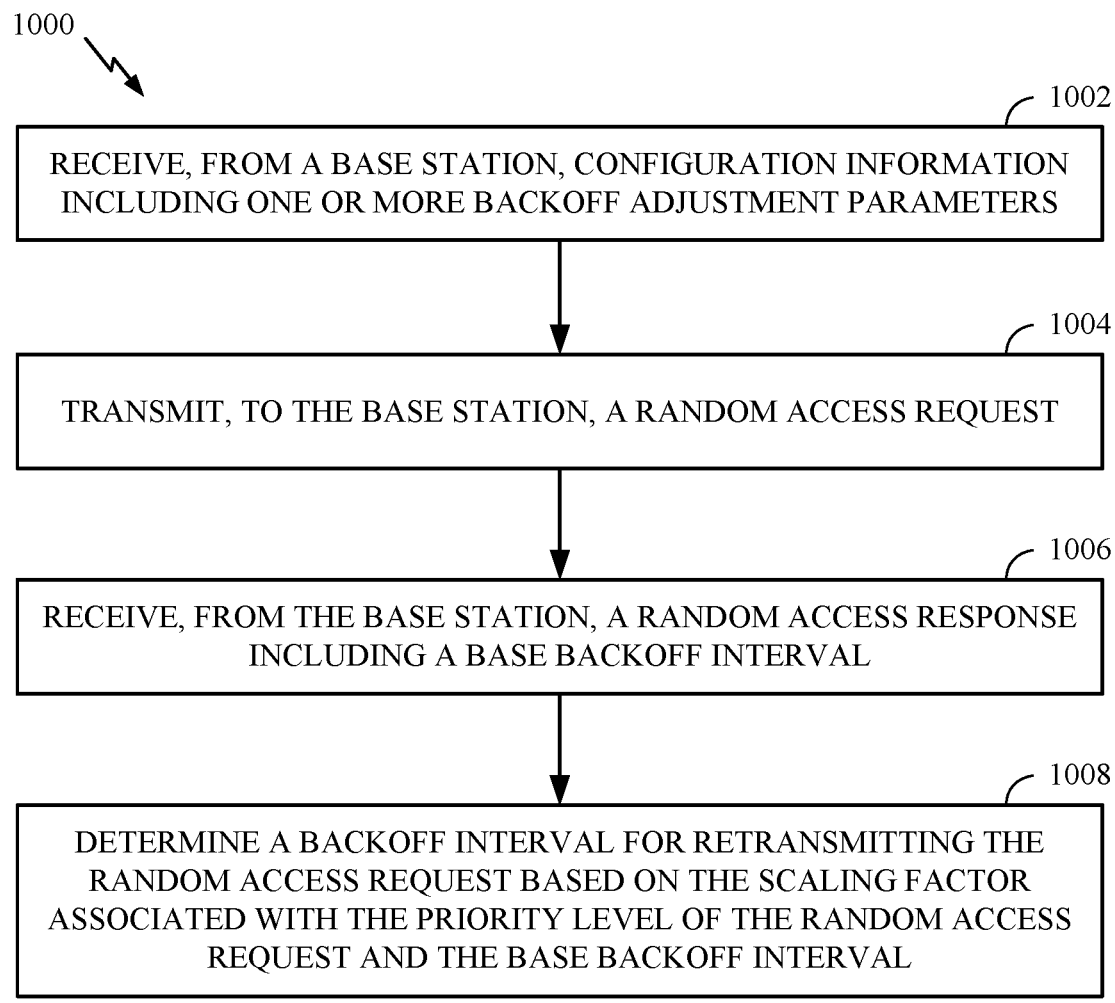
FIG. 10 illustrates an example operation performed by a user equipment (UE) for performing prioritized random access, in accordance with certain aspects of the present disclosure.

FIG. 10 illustrates example operations that may be performed by a user equipment for prioritized random access, according to an embodiment. As illustrated, operations 1000 begin at 1002, where the user equipment receives, from a base station, configuration information including one or more backoff adjustment parameters. In some embodiments, as discussed herein, the one or more backoff adjustment parameters may include scaling factors associated with different random access priority levels. At 1004, the user equipment transmits, to a base station, a random access request, and at 1006, the user equipment receives, from the base station, a random access response. The random access response generally includes information identifying a base backoff interval. At 1008, the user equipment determines a backoff interval defining an amount of time to wait until retransmitting the random access request. The backoff interval may be determined based on the scaling factor associated with the priority level of the random access request and the base backoff interval.

Figure 11:
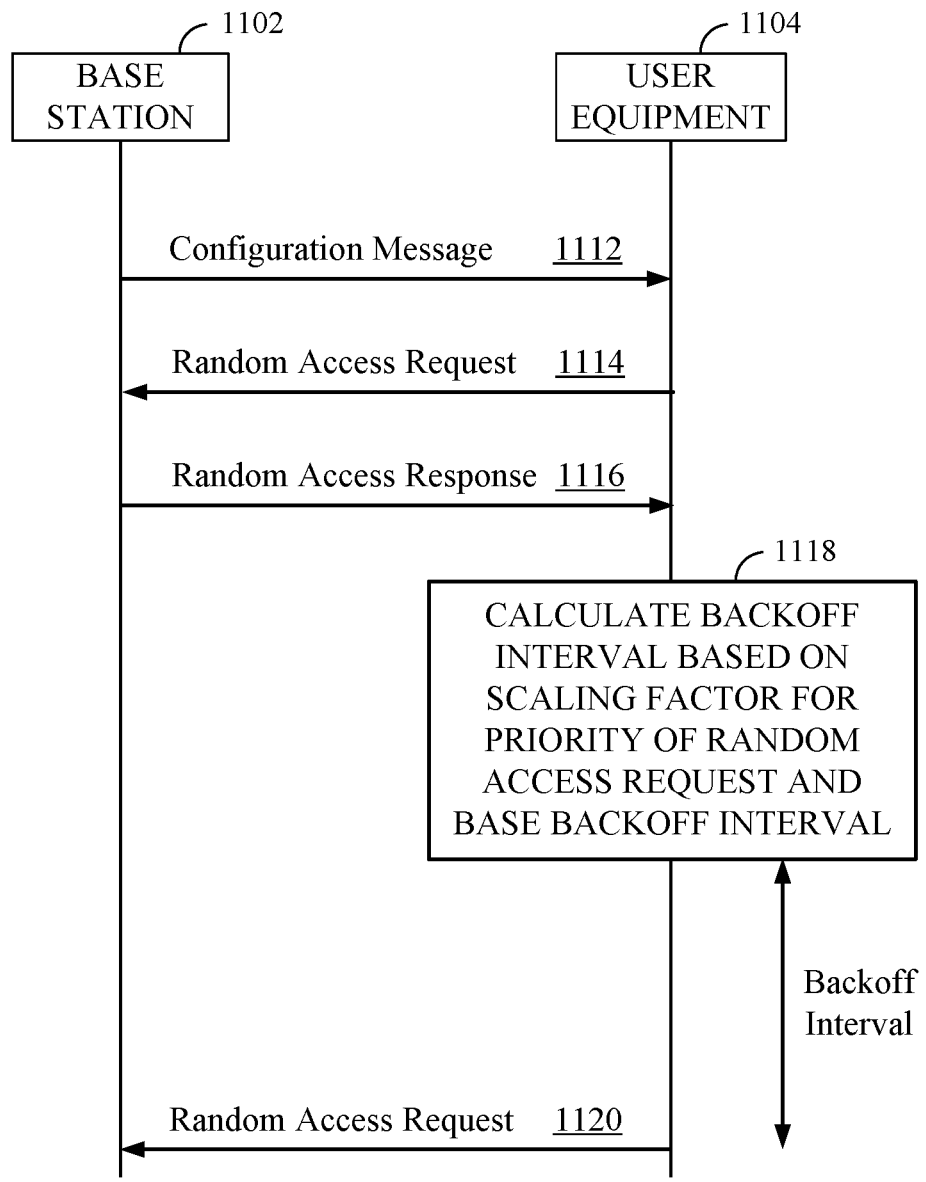
FIG. 11 is a message flow diagram illustrating messages exchanged between a base station and a user equipment for performing prioritized random access, in accordance with certain aspects of the present disclosure.

FIG. 11 illustrates messages that may be exchanged between a base station and a user equipment for prioritized random access, according to an embodiment. As illustrated, base station 1102 transmits, to user equipment 1104, a configuration message 1112 including one or more backoff scaling factors and random access priority levels associated with each of the one or more backoff scaling factors. Subsequently, user equipment 1104 transmits, to base station 1102, a random access request message 1114. In response, base station 1102 transmits a random access response message 1116. Random access response message 1116 generally includes a base backoff interval which user equipment 1104 uses, in part, to determine a backoff interval for retransmission of the random access request. At 1118, the user equipment calculates the backoff interval for retransmission of the random access request. As discussed, the backoff interval may be calculated as the product of the base backoff interval and the backoff scaling factor for the priority level of the random access request. After the calculated backoff interval time has elapsed, user equipment 1104 retransmits the random access request in random access message retransmission 1120 to establish a connection with the base station. After user equipment 1104 has established a connection with base station 1102, data and control transmissions may subsequently be performed between base station 1102 and user equipment 1104.

In some embodiments, the backoff adjustment parameters transmitted from the base station to the user equipment may include two parameters: a priority threshold p and a scaling factor s. As discussed herein, the priority information p and scaling factor s may be signaled to a UE in configuration information from a base station or in a response to a random access grant. In embodiments where a UE receives the priority information p and scaling factor s in configuration information from a base station, the UE can use the configured scaling factors associated with the priority information p for a particular type of a random access event and a signaled backoff interval included in a random access response to calculate a backoff interval for the random access event. For example, for a random access request with a given priority level $p_1$ associated with a backoff scaling factor $s_1$, the UE can calculate the backoff interval for the random access request according to the function $s_1$* signaled_backoff_interval.

In some embodiments, when the UE receives the backoff adjustment parameters (e.g., in a random access response), the UE can compare the priority of the random access event invoked in the previously-transmitted random access request to the priority threshold p. If the priority of the random access event exceeds the priority threshold p, the UE need not adjust the backoff interval for the random access event. Otherwise, if the priority of the random access event is less than the priority threshold p, the UE updates the backoff interval based on the index j (discussed above) and the scaling factor s. To update the backoff interval, the UE can adjust T1$j$ and T2$j$ based on the scaling factor and an a priori defined equation f(j, s) for T1$j$ and g(j, s) for T2$j$. Functions f( ) and g( ) may be pre-defined as functions that receive a priority index j and scaling factor s as input and may be known to both the network and the UEs. In some cases, functions f( ) and g( ) may be the same function. In one example, the scaling functions may be defined as f=j*s, f=s*f=s, and so on.

In some embodiments, each access priority level may be associated with a backoff table. The backoff tables for each priority level may be defined a priori and known to both the network and the UEs or transmitted in confirmation information from a base station to a UE. The backoff tables may include a plurality of entries, with an index in the backoff table being associated with backoff timing information. In some cases, the backoff timing information in the backoff table may include lower and upper bounds T1$j$ and T2$j$, respectively for each index in the table. In some cases, the start time may be static for each entry in a backoff table and fixed at a particular value. In some cases, the backoff timing information may include a backoff scaling factor associated with each priority level.

The user equipment may receive a single parameter d as the backoff indicator included in a random access response. A UE can use the parameter d to search for the appropriate backoff interval in a lookup table (which, as discussed above, may be defined a priori and known to both the network and the UE). The UE can determine a backoff interval to use in transmitting and retransmitting random access requests by searching the backoff interval lookup table associated with the priority index j for the entry (e.g., two-tuple of {T1$j$, T2$j$}) associated with the received parameter d.

In some embodiments, random access events may be divided into four categories: control plane events, data plane events in idle mode, data plane events in connected mode, and random access for initial attachment. Each of these events may be associated with a different priority, as discussed above.

In some embodiments, the lookup tables may be defined a priori. A plurality of lookup tables may be established, with each lookup table being associated with a different access priority level. Because there are a small number of control plane events, and because random access events in the data plane may be represented by a Quality of Service (QoS) Class Identifier (QCI), mappings between different random access events and access priority levels may also be defined a priori. For an initial attachment event, because the UE may not have a QCI, the initial attachment event may be mapped to a default access priority.

In some embodiments, mappings between random access events and access priority levels may be configured by the network and transmitted over the air. These mappings may be carried, for example, in dedicated signaling or one or more system information blocks (SIBs) which may be broadcast periodically over the air. Because the network may configure how different types of random access events are mapped to different access priorities, configuring mappings between random access events and access priority levels may increase the flexibility of processing prioritized random access events. Further, as network conditions change, the network can dynamically adjust the mappings between random access events and access priority levels.

In some embodiments, a priori defined information and dynamically mapped information may be used together to prioritize random access events. For example, because the relative priority among random access events may be relatively static, the relative priority information (e.g., access priority levels) may be defined a priori and captured in a ranking index. The network may advertise mappings between the ranking indices and access priority over the air to the UEs in the network. The mapping data may, in some embodiments, be carried in dedicated signaling or one or more system information blocks (SIBs).

Figure 12:
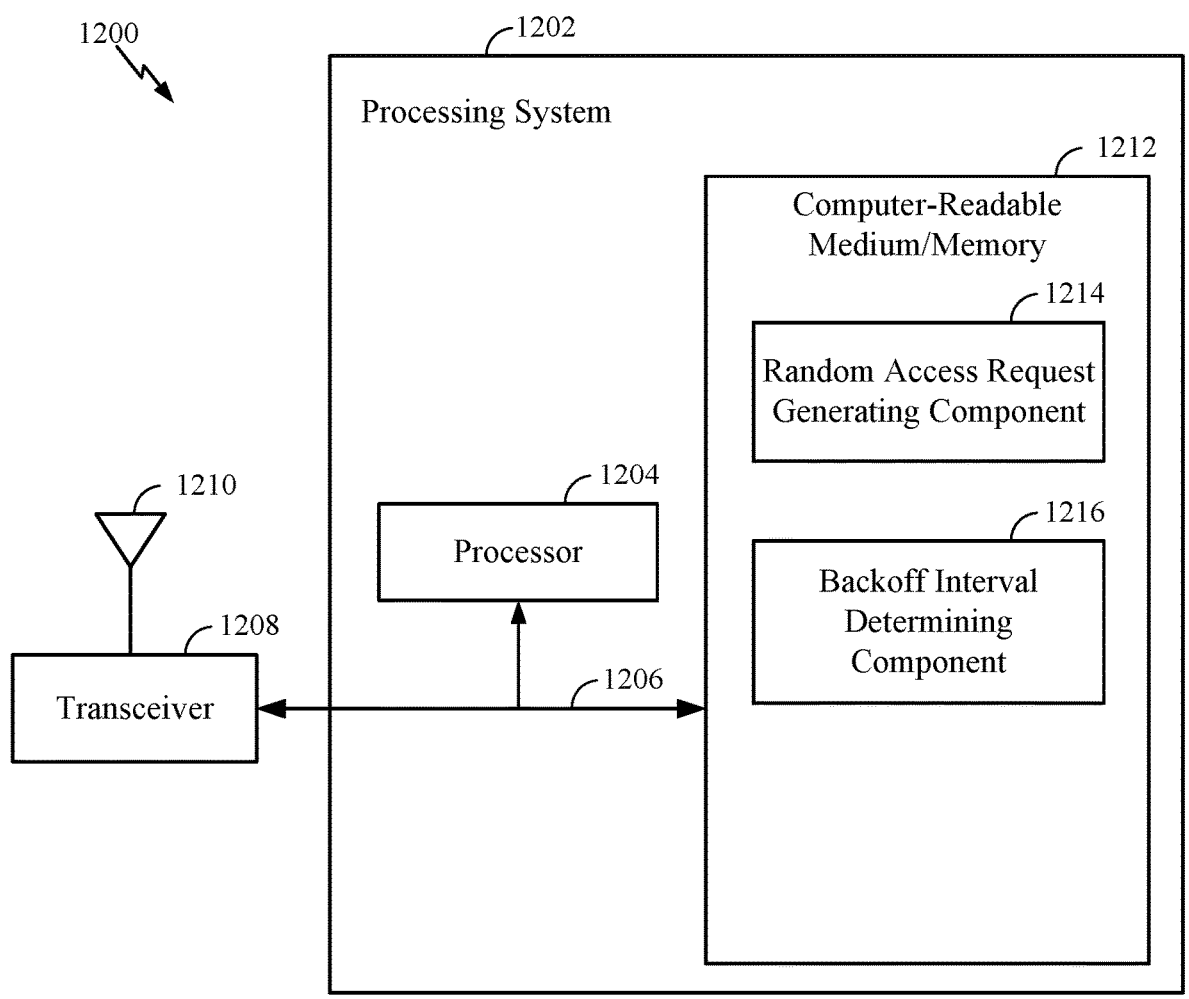
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIGS. 7-11. The communications device 1200 includes a processing system 1202 coupled to a transceiver 1208. The transceiver 1208 is configured to transmit and receive signals for the communications device 1200 via an antenna 1210, such as the various signal described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions that when executed by processor 1204, cause the processor 1204 to perform the operations illustrated in FIGS. 7-11, or other operations for performing the various techniques discussed herein.

In certain aspects, the processing system 1202 further includes a random access request generating component 1214 for performing the operations illustrated in FIGS. 7-11. Additionally, the processing system 1202 includes a backoff interval determining component 1216 for performing the operations illustrated in FIGS. 7-11. The random access request generating component 1214 and backoff interval determining component 1216 may be coupled to the processor 1204 via bus 1206. In certain aspects, the random access request generating component 1214 and backoff interval determining component 1216 may be hardware circuits. In certain aspects, the random access request generating component 1214 and backoff interval determining component 1216 may be software components that are executed and run on processor 1204.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a base station, comprising:
   configuring a first user equipment with at least one backoff adjustment parameter for one or more priority levels for random access requests;
   receiving, from the first user equipment, a random access request; and
   transmitting, to one or more user equipment including the first user equipment, a random access response including a base backoff interval to modify a backoff interval at the user equipment based on the priority level of the random access request, wherein the backoff adjustment parameter comprises a lower bound and upper bound for the backoff interval for each of the one or more priority levels.

2. The method of claim 1, wherein the random access request includes information identifying a type of a random access event being invoked.

3. The method of claim 1, wherein the at least one backoff adjustment parameter comprises a priority threshold and a scaling factor.

4. The method of claim 1, wherein the at least one backoff adjustment parameter comprises a lookup table including a plurality of priority levels associated with different types of random access events and a backoff scaling factor associated with each priority level.

5. The method of claim 4, wherein the backoff parameter lookup tables are transmitted to the user equipment via one or more system information blocks (SIBs).

6. The method of claim 1, further comprising:
   transmitting, to the one or more user equipment, a mapping between ranking index information for each type of random access event and an access priority.

7. The method of claim 6, wherein the mapping is transmitted to the one or more user equipment via dedicated signaling or one or more system information blocks (SIBs).

8. A method for wireless communications by a user equipment, comprising:
   receiving, from a base station, configuration information including at least one backoff adjustment parameter for one or more priority levels for random access requests;
   transmitting, to the base station, a random access request;
   receiving, from the base station, a random access response including a base backoff interval; and
   based on a backoff adjustment parameter associated with a priority of the random access request and the base backoff interval, determining a backoff interval defining an amount of time to wait until retransmitting the random access request, wherein the configuration information comprises a lower bound and upper bound for a backoff interval for the one or more priority levels, and wherein determining the backoff interval comprises selecting a backoff interval based on the lower and upper bounds for the backoff interval.

9. The method of claim 8, wherein the at least one backoff adjustment parameter comprises a priority threshold and a scaling factor.

10. The method of claim 8, wherein determining the backoff interval comprises:
    upon determining that the priority associated with a type of the random access request is less than a priority threshold, adjusting the backoff interval based on a scaling factor, the priority associated with the type of the random access request, and the base backoff interval.

11. The method of claim 8, wherein the at least one backoff adjustment parameter comprises an index in a lookup table.

12. The method of claim 11, wherein determining the backoff interval comprises identifying the backoff scaling factor associated with the index in a lookup table associated with the priority of the type of the random access request.

13. The method of claim 8, further comprising:
    receiving access priority information and backoff parameter lookup tables from the base station.

14. The method of claim 13, wherein the access priority information and backoff parameter lookup tables are received from the base station via one or more system information blocks (SIBs).

15. The method of claim 8, further comprising:
    receiving a mapping between ranking index information for each type of random access event and an access priority from the base station.

16. The method of claim 15, wherein the mapping is received from the base station via dedicated signaling or one or more system information blocks (SIBs).

17. The method of claim 8, further comprising:
    determining the one or more priority levels based on a type of random access event; and
    determining a random access interval based at least on the one or more priority levels, the at least one backoff adjustment parameter and the base backoff interval.

18. The method of claim 8, further comprising: delaying retransmitting the random access request by a random amount of time between the lower bound and the upper bound for the backoff interval for the one or more priority levels.

19. An apparatus for wireless communications, comprising:
    a processor configured to:
      configure a first user equipment with at least one backoff adjustment parameter for one or more priority levels for random access requests;
      receive, from the first user equipment, a random access request, and
      transmit, to one or more user equipment including the first user equipment, a random access response including a base backoff interval to modify a backoff interval at the user equipment based on the priority of the random access request, wherein the backoff adjustment parameter comprises a lower bound and upper bound for the backoff interval for each of the one or more priority levels; and
    a memory.

20. The apparatus of claim 19, wherein the random access request includes information identifying a type of a random access event being invoked.

21. The apparatus of claim 20, further comprising:
    transmitting, to the one or more user equipment, a mapping between ranking index information for each type of random access event and an access priority.

22. The apparatus of claim 21, wherein the mapping is transmitted to the one or more user equipment via dedicated signaling or one or more system information blocks (SIBs).

23. The apparatus of claim 19, wherein the at least one backoff adjustment parameter comprises a priority threshold and a scaling factor.

24. The apparatus of claim 19, wherein the at least one backoff adjustment parameter comprises a lookup table including a plurality of priority levels associated with different types of random access events and a backoff scaling factor associated with each priority level.

25. The apparatus of claim 24, wherein the backoff parameter lookup tables are transmitted to the user equipment via one or more system information blocks (SIBs).

26. An apparatus for wireless communications, comprising:
 a processor configured to:
  receive, from a base station, configuration information including at least one backoff adjustment parameter for one or more priority levels for random access requests,
  transmit, to the base station, a random access request,
  receive, from the base station, a random access response including a base backoff interval, and
  based on a backoff adjustment parameter associated with a priority of the random access request and the base backoff interval, determine a backoff interval defining an amount of time to wait until retransmitting the random access request, wherein the configuration information comprises a lower bound and upper bound for a backoff interval for the one or more priority levels, and wherein determining the backoff interval comprises selecting a backoff interval based on the lower and upper bounds for the backoff interval; and
 a memory.

27. The apparatus of claim 26, wherein the at least one backoff adjustment parameter comprises a priority threshold and a scaling factor, and wherein the processor is configured to determine the backoff interval by:
 upon determining that the priority associated with a type of the random access request is less than a priority threshold, adjusting the backoff interval based on a scaling factor, the priority associated with the type of the random access request, and the base backoff interval.

28. The apparatus of claim 26, wherein the at least one backoff adjustment parameter comprises an index in a lookup table, and wherein the processor is configured to determine the backoff interval by:
 identifying the backoff scaling factor associated with the index in a lookup table associated with the priority of the type of the random access request.

29. The apparatus of claim 26, wherein the processor is further configured to:
 receive access priority information and backoff parameter lookup tables from the base station.

30. The apparatus of claim 26, wherein the processor is further configured to:
 receive a mapping between ranking index information for each type of random access event and an access priority from the base station.

\* \* \* \* \*